(12) United States Patent　　　(10) Patent No.:　US 12,566,584 B2

Kim　　　(45) Date of Patent:　Mar. 3, 2026

(54) DISPLAY DRIVER INTEGRATED CIRCUIT AND DISPLAY DEVICE INCLUDING THE SAME

(71) Applicant: Samsung Display Co., LTD., Yongin-si (KR)

(72) Inventor: Gigeun Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/822,226

(22) Filed: Sep. 1, 2024

(65) Prior Publication Data

US 2025/0251898 A1　　Aug. 7, 2025

(51) Int. Cl.
　　*G09G 3/3225*　　(2016.01)
　　*G06F 3/147*　　(2006.01)
　　(Continued)

(52) U.S. Cl.
　　CPC .......... *G06F 3/147* (2013.01); *G09G 3/3208* (2013.01); *G09G 3/3225* (2013.01);
　　(Continued)

(58) Field of Classification Search
　　CPC .......... G09G 2320/048; G09G 3/3208; G09G 2320/029; G09G 2320/0285; G09G 2320/043; G09G 2360/16; G09G 2320/045; G09G 3/3233; G09G 2320/041; G09G 2300/0819; G09G 2320/0295; G09G 3/3225; G09G 2320/04; G09G 2340/0428; G09G 2320/0242; G09G 2320/0233; G09G 2320/046; G09G 2320/0257; G09G 2320/0693; G09G 2330/12; G09G 3/006; G09G 2320/0626; G09G 2340/16;
(Continued)

(56) References Cited

U.S. PATENT DOCUMENTS 7,675,492 B2　　3/2010　Park et al.
9,852,681 B2　　12/2017　Song
(Continued)

FOREIGN PATENT DOCUMENTS

KR　　1020210091859 A　　7/2021
KR　　1020230064043 A　　5/2023

*Primary Examiner* — Dismery Mercedes
(74) *Attorney, Agent, or Firm* — CANTOR COLBURN LLP

(57)　　ABSTRACT

A display driver integrated circuit includes a first memory, a compensator, a sampler and a data processor. The first memory stores accumulated stress data. The compensator generates an output data for image display by compensating an input image data based on the accumulated stress data. The sampler selects a slice data. The data processor generates a present slice accumulated data of a present slice accumulated data set by summing the selected slice data with a previous slice accumulated data of a previous slice accumulated data set, selects a maximum value as a present maximum value, determines whether the present slice accumulated data is abnormal based on comparing a previous maximum value of the previous slice accumulated data set with the present maximum value and selectively updates the previous slice accumulated data set by selectively storing the present slice accumulated data set in the first memory based on the determination.

20 Claims, 13 Drawing Sheets

(51) Int. Cl.
  *G09G 3/20*        (2006.01)
  *G09G 3/3208*      (2016.01)
  *G09G 3/3233*      (2016.01)
(52) U.S. Cl.
  CPC ... *G09G 3/3233* (2013.01); *G09G 2300/0819*
      (2013.01); *G09G 2310/0294* (2013.01); *G09G*
      *2320/0285* (2013.01); *G09G 2320/043*
      (2013.01); *G09G 2320/045* (2013.01); *G09G*
      *2320/046* (2013.01); *G09G 2320/048*
      (2013.01); *G09G 2330/10* (2013.01); *G09G*
      *2340/0428* (2013.01); *G09G 2360/16*
                                      (2013.01)
(58) Field of Classification Search
  CPC ............. G09G 3/2022; G09G 2330/10; G09G
      2330/04; G09G 3/3275; G09G 3/3258;
                                      G09G 3/32
  See application file for complete search history.

(56)                References Cited

U.S. PATENT DOCUMENTS 11,062,660 B1 *   7/2021  Sohn ................... G09G 3/3291

| 11,663,966 B2 * | 5/2023 | In | G09G 3/3225 |
| | | | 345/207 |
| 2013/0176324 A1 * | 7/2013 | Yamashita | G09G 5/02 |
| | | | 345/589 |
| 2014/0168039 A1 * | 6/2014 | Kim | G09G 3/3208 |
| | | | 345/82 |
| 2016/0140895 A1 * | 5/2016 | Park | G09G 3/3208 |
| | | | 345/690 |
| 2018/0020525 A1 * | 1/2018 | Moon | H01J 1/62 |
| 2018/0025468 A1 * | 1/2018 | Kim | G06T 3/20 |
| | | | 345/682 |
| 2018/0151119 A1 * | 5/2018 | Lee | G09G 3/3233 |
| 2020/0098323 A1 * | 3/2020 | Lee | G09G 3/3607 |
| 2021/0193057 A1 * | 6/2021 | Shin | G09G 3/3275 |
| 2021/0217368 A1 * | 7/2021 | Sohn | G09G 3/006 |
| 2021/0383735 A1 * | 12/2021 | Kim | G09G 3/20 |
| 2022/0013069 A1 * | 1/2022 | An | G09G 3/3266 |
| 2022/0028319 A1 * | 1/2022 | Kim | G09G 3/3233 |
| 2022/0139309 A1 * | 5/2022 | Ok | G09G 3/3225 |
| | | | 345/214 |
| 2022/0189400 A1 * | 6/2022 | Hong | G09G 3/3275 |
| 2022/0223104 A1 * | 7/2022 | Sun | G09G 3/2003 |
| 2022/0319439 A1 * | 10/2022 | Pyun | G09G 3/3233 |
| 2024/0094969 A1 * | 3/2024 | Hershey | G09G 3/006 |

* cited by examiner

| SLADS_P: | SLAD_P | MAX_P | CS_P |
|---|---|---|---|

| SLADS_C: | SLAD_C | MAX_C | CS_C |
|---|---|---|---|

430

MAX_C

431

DIFFERENCE
VALUE
GENERATOR

MAX_P

MAX_DIF

433

COMPARATOR

REF_M

CKS

SLADS

| SLAD | MAX | MV | CS |
|------|-----|----|----|

DISPLAY DRIVER INTEGRATED CIRCUIT AND DISPLAY DEVICE INCLUDING THE SAME

This application claims priority under 35 USC § 119 to Korean Patent Applications No. 10-2024-0017940, filed on Feb. 6, 2024, and all the benefits accruing therefrom under 35 U.S.C. § 119, the content of which in its entirety is herein incorporated by reference.

BACKGROUND

1. Field

Embodiments relate generally to semiconductor integrated circuits, and more particularly to display driver integrated circuits for driving display panels and display devices including the display driver integrated circuits.

2. Description of the Related Art

As information technology is developed, a display device becomes important to provide information to a user. Various display devices such as liquid crystal displays ("LCDs"), plasma displays, and electroluminescent displays gain popularity. Among these, electroluminescent displays have quick response speeds and reduced power consumption, using light-emitting diodes ("LEDs") or organic light-emitting diodes ("OLEDs") that emit light through recombination of electrons and holes.

The electroluminescent display has advantages such as rapid response and low power consumption. The typical OLED display device supply a current corresponding to a data signal using driving transistors of respective pixels to generate lights through the OLEDs of the respective pixels. As such, the electroluminescent display device displays an image using a current. The driving transistors and the OLEDs deteriorate with time of use, and various technologies are researched to compensate this.

SUMMARY

Some embodiments provide a display driver integrated circuit capable of securing integrity of accumulated stress data while performing image sticking compensation.

Some embodiments provide a display device including the display driver integrated circuit capable of securing integrity of accumulated stress data while performing image sticking compensation.

In an embodiment of the disclosure, a display driver integrated circuit for driving a display panel including a plurality of pixels, includes a first memory, a compensator, a sampler and a data processor. The first memory stores accumulated stress data for compensating degradation of the plurality of pixels. The compensator generates an output data for image display by compensating an input image data based on the accumulated stress data. The sampler selects a slice data by a slice unit, from each of a plurality of frames of the input image data based on a clock signal. The data processor generates a present slice accumulated data of a present slice accumulated data set associated with a selected frame from the plurality of frames by summing the selected slice data with a previous slice accumulated data of a previous slice accumulated data set associated with the selected frame with the selected slice data, selects a maximum value from among degradation values of pixels included in the present slice accumulated data as a present maximum value, determines whether the present slice accumulated data is abnormal based on comparing a previous maximum value of the previous slice accumulated data set with the present maximum value and selectively updates the previous slice accumulated data set by selectively storing the present slice accumulated data set in the first memory based on the determination whether the present slice accumulated data is abnormal.

In an embodiment, the slice unit includes at least one pixel row from among the plurality of pixels or at least one pixel column from among the plurality of pixels.

In an embodiment, the data processor includes an accumulator, a maximum value generator, a maximum value checker, a checksum generator and an interrupt signal generator. The accumulator generates the present slice accumulated data by summing the selected slice data with the previous slice accumulated data. The maximum value generator selects a maximum value from among the degradation values of the pixels included in the present slice accumulated data as the present maximum value. The maximum value checker generates a difference value between the present maximum value and the previous maximum value, compare the difference value with a reference value and generate a check signal indicating whether the present slice accumulated data is abnormal based on the comparison of the difference value with the reference value. The checksum generator generates a present checksum of the present slice accumulated data set by performing a cyclic redundancy check ("CRC") operation on the degradation values of the pixels included in the present slice accumulated data. The interrupt signal generator generates an interrupt signal that is activated when the present maximum value is abnormal, based on the check signal.

In an embodiment, the maximum value checker outputs the check signal with a first logic level in response to the difference value being equal to or smaller than the reference value. The checksum generator performs the CRC operation in response to the check signal having the first logic level.

In an embodiment, the maximum value checker outputs the check signal with a second logic level different from a first logic level in response to the difference value being greater than the reference value. The checksum generator withholds performing the CRC operation in response to the check signal having the second logic level.

In an embodiment, the maximum value checker includes a difference value generator and a comparator. The difference value generator generates the difference value by subtracting the previous maximum value from the present maximum value. The comparator generates the check signal by comparing the difference value with the reference value and determine a logic level of the check signal based on a result of the comparison of the difference value with the reference value.

In an embodiment, the display driver integrated circuit further includes a second memory. When the display driver integrated circuit is powered on, the accumulated stress data is loaded from a third memory disposed outside the display driver integrated circuit and are stored in the first memory. The sampler provides the first memory with a target address associated with the selected slice data and the first memory provides the previous slice accumulated data set to the second memory in response to the target address.

In an embodiment, the second memory provides the previous slice accumulated data set to the data processor and provides the first memory with the present slice accumulated data set provided to the data processor.

In an embodiment, the data processor provides the second memory with an interrupt signal indicating whether the present maximum value is abnormal and the second memory stops operation in response to the interrupt signal indicating that the present maximum value is abnormal.

In an embodiment, the display driver integrated circuit further includes an error detector. The error detector determines whether the accumulated stress data loaded from the third memory is abnormal based on a maximum values and a checksum in the accumulated stress data loaded from the third memory and provides the second memory with an interrupt signal indicating whether the accumulated stress data is abnormal.

In an embodiment, the second memory withholds operation in response to the interrupt signal indicating that the present maximum value is abnormal.

In an embodiment, the display driver integrated circuit further includes a memory interface. The memory interface provides the first memory with the accumulated stress data loaded from the third memory and performs a back-up operation to store the accumulated stress data stored in the first memory, in the third memory with a pre-determined period.

In an embodiment, the first memory is a nonvolatile memory device and each of the second memory and the third memory is a volatile memory device.

In an embodiment, the display driver integrated circuit further includes a second memory, an encoding/decoding logic and a decoding logic. The encoding/decoding logic provides an encoded present slice accumulated data set to the second memory by encoding the present slice accumulated data set provided from the data processor and provides the previous slice accumulated data set to the second memory by decoding an encoded previous slice accumulated data set provided from the first memory. The decoding logic provides the accumulated stress data to the compensator by decoding the encoded accumulated stress data.

In an embodiment, when the display driver integrated circuit is powered on, the encoded accumulated stress data is loaded from a third memory disposed outside the display driver integrated circuit and are stored in the first memory. The sampler provides the first memory with a target address associated with the selected slice data and the first memory provides the encoded previous slice accumulated data set to the encoding/decoding logic in response to the target address.

In an embodiment, the data processor provides the second memory with an interrupt signal indicating whether the present maximum value is abnormal and the second memory withholds operation in response to the interrupt signal indicating that the present maximum value is abnormal.

In an embodiment of the disclosure, a display device includes display panel including a plurality of pixels and a display driver integrated circuit that drives the display panel. The display driver integrated circuit includes a first memory, a compensator, a sampler and a data processor. The first memory stores accumulated stress data for compensating degradation of the plurality of pixels. The compensator generates an output data for image display by compensating an input image data based on the accumulated stress data. The sampler selects a slice data by a slice unit, from each of a plurality of frames of the input image data based on a clock signal. The data processor generates a present slice accumulated data of a present slice accumulated data set associated with a selected frame from the plurality of frames by summing the selected slice data with a previous slice accumulated data of a previous slice accumulated data set associated with the selected frame with the selected slice data, selects a maximum value from among degradation values of pixels included in the present slice accumulated data as a present maximum value, determines whether the present slice accumulated data is abnormal based on comparing a previous maximum value of the previous slice accumulated data set with the present maximum value and selectively updates the previous slice accumulated data set by selectively storing the present slice accumulated data set in the first memory based on the determination whether the present slice accumulated data is abnormal.

In an embodiment, the slice unit includes at least one pixel row from among the plurality of pixels or at least one pixel column from among the plurality of pixels.

In an embodiment, the data processor includes an accumulator, a maximum value generator, a maximum value checker, a checksum generator and an interrupt signal generator. The accumulator generates the present slice accumulated data by summing the selected slice data with the previous slice accumulated data. The maximum value generator selects a maximum value from among the degradation values of the pixels included in the present slice accumulated data as the present maximum value. The maximum value checker generates a difference value between the present maximum value and the previous maximum value, compare the difference value with a reference value and generate a check signal indicating whether the present slice accumulated data is abnormal based on the comparison of the difference value with the reference value. The checksum generator generates a present checksum of the present slice accumulated data set by performing a CRC operation on the degradation values of the pixels included in the present slice accumulated data. The interrupt signal generator generates an interrupt signal that is activated when the present maximum value is abnormal, based on the check signal.

In an embodiment, the display driver integrated circuit further includes a second memory and an error detector and an encoding/decoding logic which provides an encoded present slice accumulated data set to the second memory by encoding the present slice accumulated data set provided from the data processor and provides the previous slice accumulated data set to the second memory by decoding an encoded previous slice accumulated data set provided from the first memory.

The sampler provides the first memory with a target address associated with the selected slice data. The first memory provides the encoded previous slice accumulated data set to the encoding/decoding logic in response to the target address. The second memory provides the previous slice accumulated data set to the data processor and provides the first memory with the present slice accumulated data set provided to the data processor. The data processor provides the second memory with a first interrupt signal indicating whether the present maximum value is abnormal, and second memory withholds operation in response to the first interrupt signal indicating that the present maximum value is abnormal. The error detector determines whether the accumulated stress data loaded from a third memory is abnormal based on a maximum value and a checksum in the accumulated stress data loaded from the third memory and provides the second memory with a second interrupt signal indicating whether the accumulated stress data is abnormal. When the display driver integrated circuit is powered on, the accumulated stress data is loaded from the third memory disposed outside the display driver integrated circuit and are stored in the first memory Accordingly, when defects occur in the encoded accumulated stress data stored in the first memory, the display driver integrated circuit checks integrity of the accumulated stress data based on a change of maximum value of slice data and may withhold updating slice accumulated data in the first memory or may withhold back-up operation to store the accumulated stress data in the third memory. Then, the accumulated stress data is loaded from the third memory and the display driver integrated circuit may perform the accumulation and compensation operation based on normal slice accumulated data.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
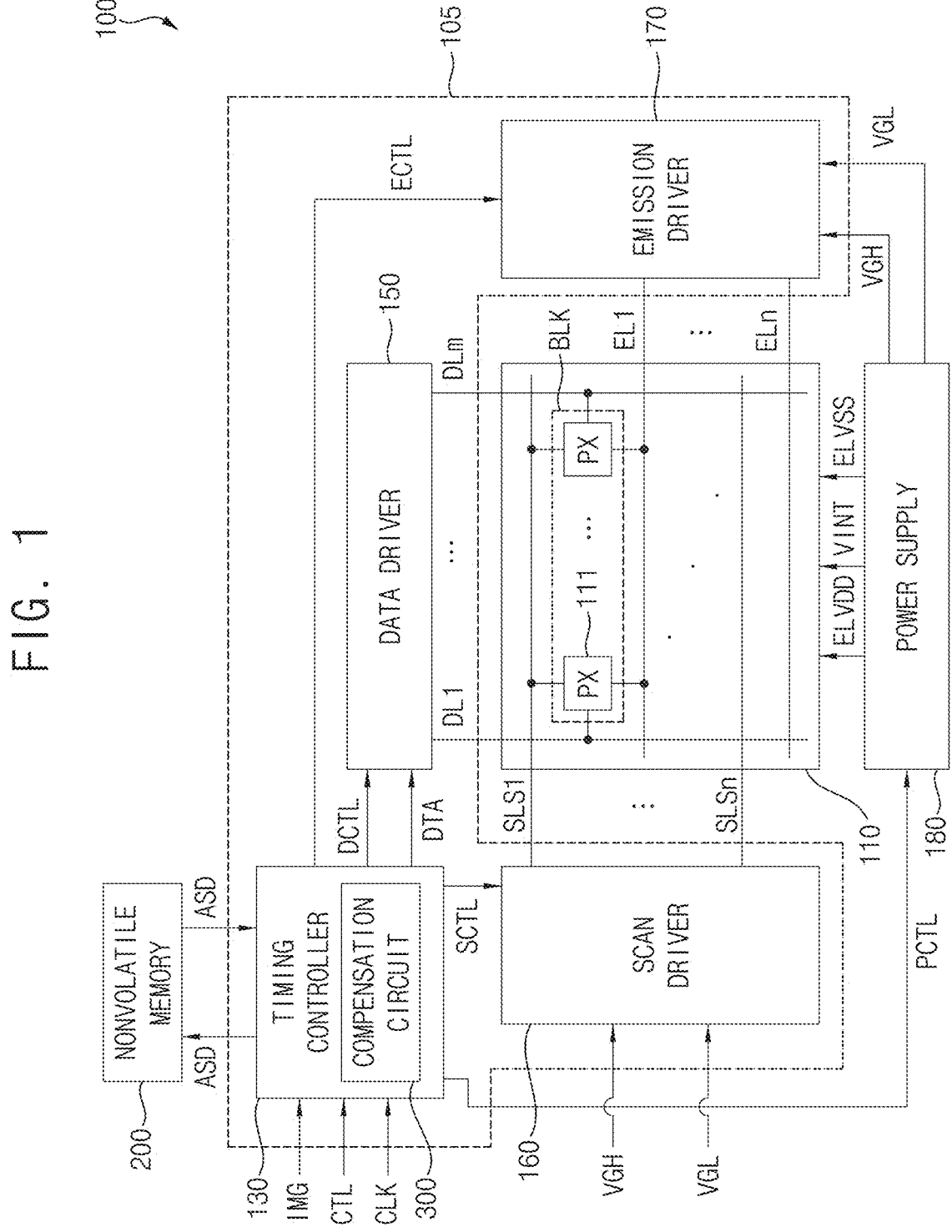
FIG. 1 is a block diagram illustrating an embodiment of an organic light-emitting diode ("OLED") display device.

The embodiments are described more fully hereinafter with reference to the accompanying drawings. Like or similar reference numerals refer to like or similar elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within +30%, 20%, 10%, 5% of the stated value, for example.

The term "compensator," "sampler," "processor" "accumulator" "maximum value generator" "maximum value checker" "checksum generator" "interrupt signal generator" "difference value generator" "comparator" "error detector" "memory interface" or "logic" as used herein is intended to mean a hardware component, e.g., circuitry, that performs a predetermined function. The hardware component may include a field-programmable gate array ("FPGA") or an application-specific integrated circuit ("ASIC"), for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating an embodiment of a display device including a display driver integrated circuit.

Referring to FIG. 1, a display device 100 may include a display driver integrated circuit 105, a display panel 110 and a power supply 180.

The display driver integrated circuit 105 may include a timing controller 130, a data driver 150, a scan driver 160, and an emission driver 170, and the timing controller 130 may include a compensation circuit 300. The timing controller 130 may be connected to a nonvolatile memory device 200 disposed outside the display driver integrated circuit 105.

The timing controller 130, the data driver 150, the scan driver 160, and the emission driver 170 may be coupled to the display panel 110 by a chip-on flexible printed circuit ("COF"), a chip-on glass ("COG"), a flexible printed circuit ("FPC"), etc.

The display panel 110 may be coupled to the scan driver 160 of the display driver integrated circuit 105 through a plurality of scan line sets SLS1-SLSn (n is an integer greater than three) may be coupled to the data driver 150 through a plurality of data lines DL1-DLm (m is an integer greater than three), and may be coupled to the emission driver 170 of the display driver integrated circuit 105 through a plurality of emission control lines EL1-ELn. The display panel 110 may include a plurality of pixels PX 111, and each pixel 111 is disposed at an intersection of each of the scan line sets SLS1-SLSn, each of the data lines DL1-DLm and each of the emission control lines EL1-ELn.

The plurality of pixels PX 111 may be grouped into a plurality of blocks BLK, and each of the plurality of blocks BLK may include at least one pixel row or at least one pixel column.

The power supply 180 may provide a higher power supply voltage ELVDD, a lower power supply voltage ELVSS and an initialization voltage VINT to the display panel 110. The power supply 180 may provide a first voltage VGL and a second voltage VGH to the emission driver 170 and the scan driver 160.

The scan driver 160 may apply a plurality of scan signals to each of the sub pixels 111 through the scan line sets SLS1-SLSn based on a second driving control signal SCTL. The scan driver 160 may enable at least two scan signals of the plurality of scan signals during non-emission interval in which the pixels do not emit light such that the scan signals are partially overlapped during two consecutive horizontal periods. The horizontal period may correspond to a period in which the data driver 150 provides the data voltages to one pixel row. The horizontal period may correspond to a period of a horizonal synchronization signal used in the timing controller 130.

The data driver 150 may apply a data voltage to each of the pixels 111 through the plurality of data lines DL1-DLm based on a first driving control signal DCTL.

The emission driver 170 may apply an emission control signal to each of the pixels 111 through the plurality of emission control lines EL1-ELn based on a third driving control signal ECTL. Luminance of the display panel 110 may be adjusted based on the emission control signal.

The power supply 180 may provide the relatively high power supply voltage ELVDD, the lower power supply voltage ELVSS and the initialization voltage VINT to the display panel 110, and may provide the first voltage VGL and the second voltage VGH to the emission driver 170 and the scan driver 160, in response to a power control signal PCTL.

The timing controller 130 may receive input image data IMG, a control signal CTL and a clock signal CLK, and may generate the first through third driving control signals DCTL, SCTL and ECTL and the power control signal PCTL based on the control signal CTL. The timing controller 130 may provide the first driving control signal DCTL to the data driver 150, the second driving control signal SCTL to the scan driver 160, the third driving control signal ECTL to the emission driver 170 and the power control signal PCTL to the power supply 180.

The compensation circuit 300 may store an accumulated stress data ASD loaded from the nonvolatile memory device 200 when the display driver integrated circuit 105 is powered-on, may generate an output data DTA by compensating the input image data RGB (refer to FIG. 15) based on the accumulated stress data ASD and may provide the output data DTA to the data driver 150.

Due to deterioration (i.e., degradation) of the plurality of pixels PX, an image sticking phenomenon in which a mainly used image form permanently appears on a screen, causing a fatal problem in image quality. Techniques of compensating for the deterioration of the plurality of pixels PX may be roughly divided into two schemes. One is a scheme of detecting and compensating the amount of the deterioration by sensing electrical characteristics of the plurality of pixels PX using a separate circuit, and the other is a scheme of predicting and compensating the total amount of the deterioration by predicting the amount of the deterioration (e.g., usage) using input images and by accumulating the amount of the deterioration. The first scheme (e.g., a sensing scheme) may have a disadvantage in that the separate circuit for sensing the electrical characteristics is additionally desired and a separate sensing operation should be additionally performed. The second scheme (e.g., a cumulative compensating scheme) may be widely used in a mobile device because the separate sensing circuit and the separate sensing operation are not desired and the compensation is performed in real time without an additional operation. The compensation circuit 300 that is included in the display driver integrated circuit 105 and the display device 100 in embodiments may be implemented based on the above-described second scheme (e.g., the cumulative compensating scheme).

The compensation circuit 300 may select a slice data by a slice unit, from each of a plurality of frames of the input image data IMG based on the clock signal CLK, generate a present slice accumulated data of a present slice accumulated data set associated with a selected frame from the plurality of frames by summing the selected slice data with a previous slice accumulated data of a previous slice accumulated data set associated with the selected frame with the selected slice data, select a maximum value from among degradation values of pixels included in the present slice accumulated data as a present maximum value, determine whether the present slice accumulated data is abnormal based on comparing a previous maximum value of the previous slice accumulated data set with the present maximum value, selectively update the previous slice accumulated data set by selectively storing the present slice accumulated data set in the first memory based on the determination and may perform a back-up operation to store the accumulated stress data ASD in the nonvolatile memory device 200.

The nonvolatile memory device 200 may be also referred to as a third memory.

In some embodiments, at least some of the elements included in the display driver integrated circuit 105 may be disposed, e.g., directly disposed (e.g., mounted), on the display panel 110, or may be connected to the display panel 110 in a tape carrier package ("TCP") type. In an alternative embodiment, at least some of the elements included in the display driver integrated circuit 105 may be integrated on the display panel 110. In some embodiments, the elements included in the display driver integrated circuit 105 may be respectively implemented with separate circuits/modules/chips. In other embodiments, on the basis of a function, some of the elements included in the display driver integrated circuit 105 may be combined into one circuit/module/chip, or may be further separated into a plurality of circuits/modules/chips.

Figure 2:
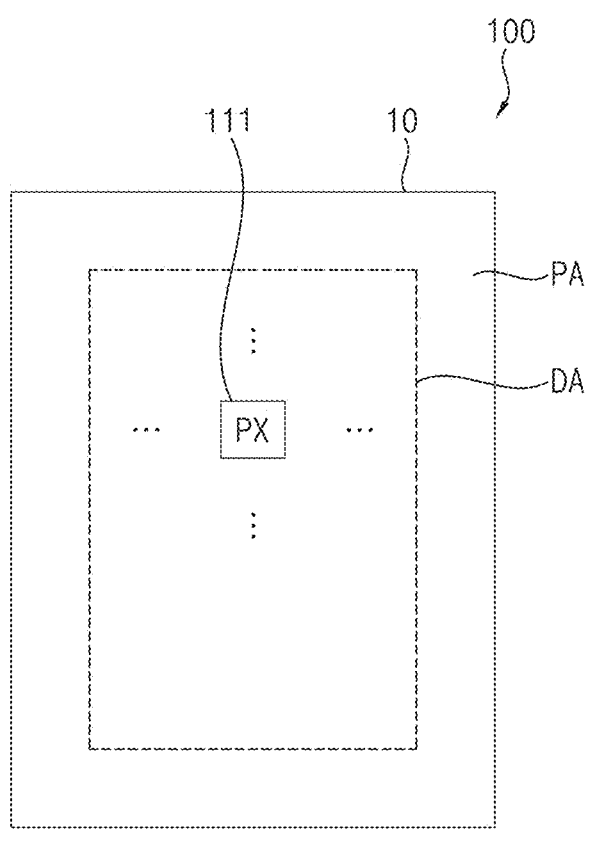
FIG. 2 is a plan view of an embodiment of the OLED display device of FIG. 1.

FIG. 2 is a plan view of an embodiment of the display device of FIG. 1.

Referring to FIG. 2 the display device 100 may include a substrate 10. The substrate 10 may include a display region DA and a peripheral region PA outside the display region DA.

A plurality of pixels 111 may be arranged in the display region DA of the substrate 10. Various wirings for transmitting an electrical signal to be applied to the display driver integrated circuit 105 and the display region DA may be in the peripheral region PA of the substrate 10. A dead space in the substrate 10 may be reduced when an occupied area by the display driver integrated circuit 105 in the display region DA.

Figure 3:
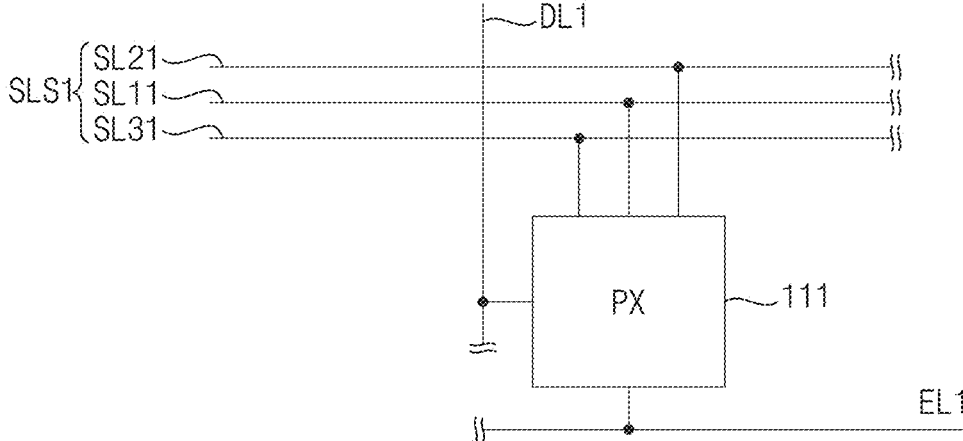
FIG. 3 illustrates connection of a pixel in the OLED display device of FIG. 1.

FIG. 3 illustrates connection of a pixel in the display device of FIG. 1.

Figure 4:
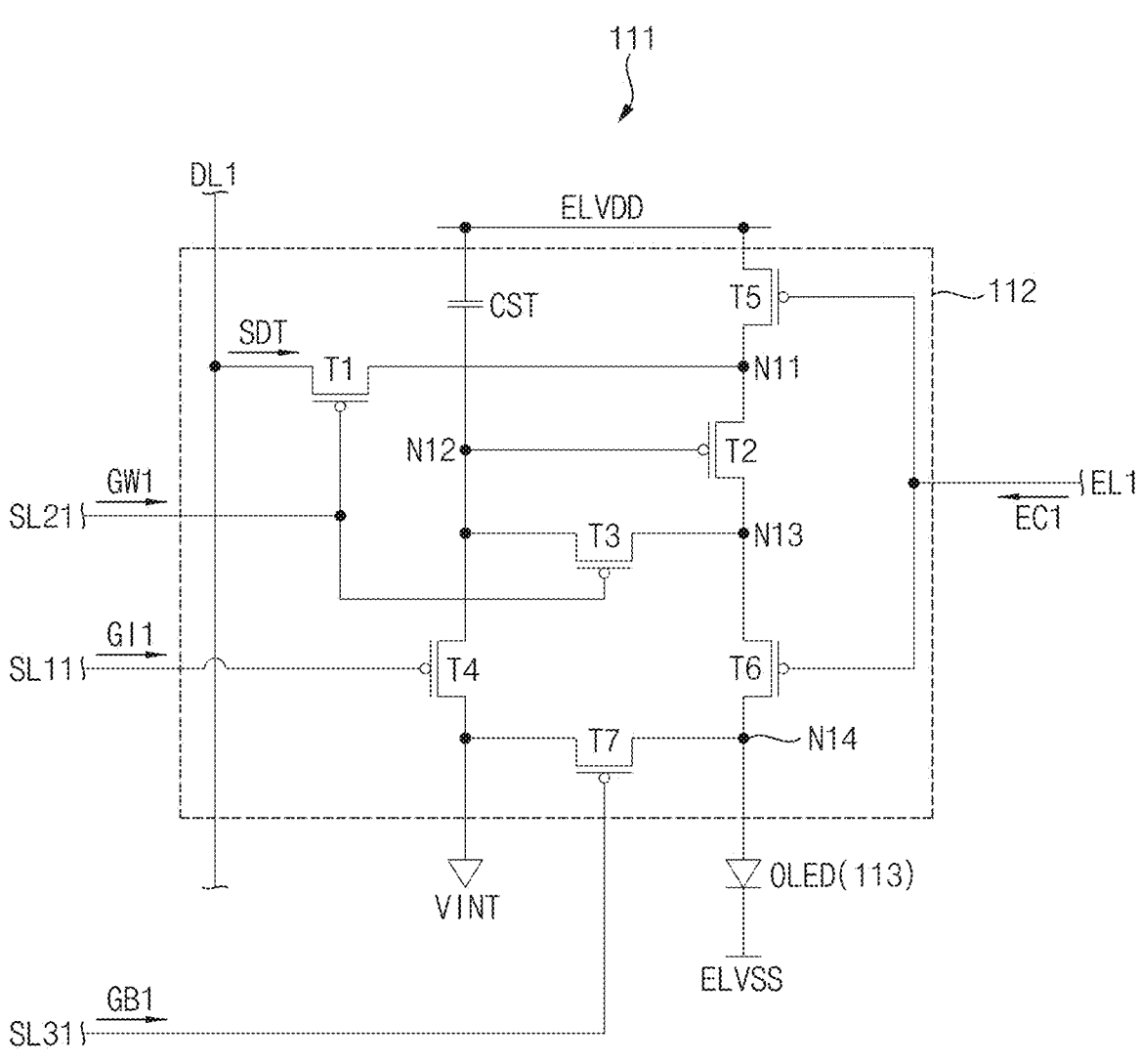
FIG. 4 is a circuit diagram illustrating an embodiment of the pixel of FIG. 3.

FIG. 4 is a circuit diagram illustrating an embodiment of the pixel in FIG. 3.

In FIGS. 3 and 4, the pixel 111 is coupled to a first scan line set SLS1, a first data line DL1 and a first emission control line EL1.

Referring to FIGS. 3 and 4, the first scan line set SLS1 includes a first scan line SL11, a second scan line SL21 and a third scan line SL31.

The pixel 111 may include a pixel circuit 112 and an organic light-emitting diode ("OLED") 113. The pixel circuit 112 may include a switching transistor T1, a driving transistor T2, a compensation transistor T3, a first initialization transistor T4, a second initialization transistor T7, first and second emission transistors T5 and T6, and a storage capacitor CST.

The switching transistor T1 may include a p-channel metal-oxide semiconductor ("PMOS") transistor that has a first electrode coupled to the data line DL1 to receive a data voltage SDT, a gate electrode coupled to the second scan line SL21 to receive a second scan signal GW1 and a second electrode coupled to a first node N11. The driving transistor T2 may include a PMOS transistor that has a first electrode coupled to a first node N11, a gate electrode coupled to a second node N12 and a second electrode coupled to a third node N13.

The compensation transistor T3 may include a PMOS transistor that has a gate electrode coupled to the second scan line SL21 to receive the second scan signal GW1, a first electrode coupled to the second node N12 and a second electrode coupled to the third node N13. The first initialization transistor T4 may include a PMOS transistor that has a gate coupled to the first scan line SL11 to receive a first scan signal GI1, a first electrode coupled to the second node N12 and a second electrode receiving the initialization voltage VINT.

The first emission transistor T5 may include a PMOS transistor that has a first electrode coupled to the relatively high power supply voltage ELVDD, a second electrode coupled to the first node N11 and a gate electrode coupled to the first emission control line EL1 to receive the first emission control signal EC1. The second emission transistor T6 may include a PMOS transistor that has a first electrode coupled to the third node N13, a second electrode coupled to the fourth node N14 and a gate electrode coupled to the first emission control line EL1 to receive the first emission control signal EC1.

The second initialization transistor T7 may include a PMOS transistor that has a gate coupled to the third scan line SL31 to receive a third scan signal GB1, a first electrode receiving the initialization voltage VINT and a second electrode coupled to the fourth node N14.

The storage capacitor CST may have a first terminal coupled to the relatively high power supply voltage ELVDD and a second terminal coupled to the second node N12. The OLED 113 may have an anode coupled to the fourth node N14 and a cathode coupled to the relatively low power supply voltage ELVSS.

The switching transistor T1 transfers the data voltage SDT to the storage capacitor CST in response to the second scan signal GW1 and the OLED 113 may emit light in response to the data voltage SDT stored in the storage capacitor CST to display image.

The emission transistors T5 and T6 are turned-on or turned-off in response to the first emission control signal EC1 to provide a current to the OLED 113 or to intercept a current from the OLED 113. When the current is intercepted from the OLED 113, the OLED 113 does not emit. Therefore, the emission transistors T5 and T6 are turned on or turned off in response to the first emission control signal EC1 to adjust a luminance of the display panel 110.

The compensation transistor T3 may connect the second node N12 and the third node N13 in response to the second scan signal GW1. That is, the compensation transistor T3 may compensate variance of threshold voltage of each driving transistor of each pixel 111 when the image is displayed by diode-connecting the gate electrode and the second electrode of the driving transistor T2.

The first initialization transistor T4 may transfer the first initialization voltage VINT to the second node N12 in response to the first scan signal GI1. The first initialization transistor T4 may initialize data voltage transferred to the driving transistor T2 during a previous frame by transferring the initialization voltage VINT to the gate electrode of the driving transistor T2.

The second initialization transistor T7 may transfer the initialization voltage VINT to the fourth node N14 in response to the third scan signal GB1 to discharge parasitic capacitance between the second emission transistor T6 and the OLED 113.

Figures 5, 6:
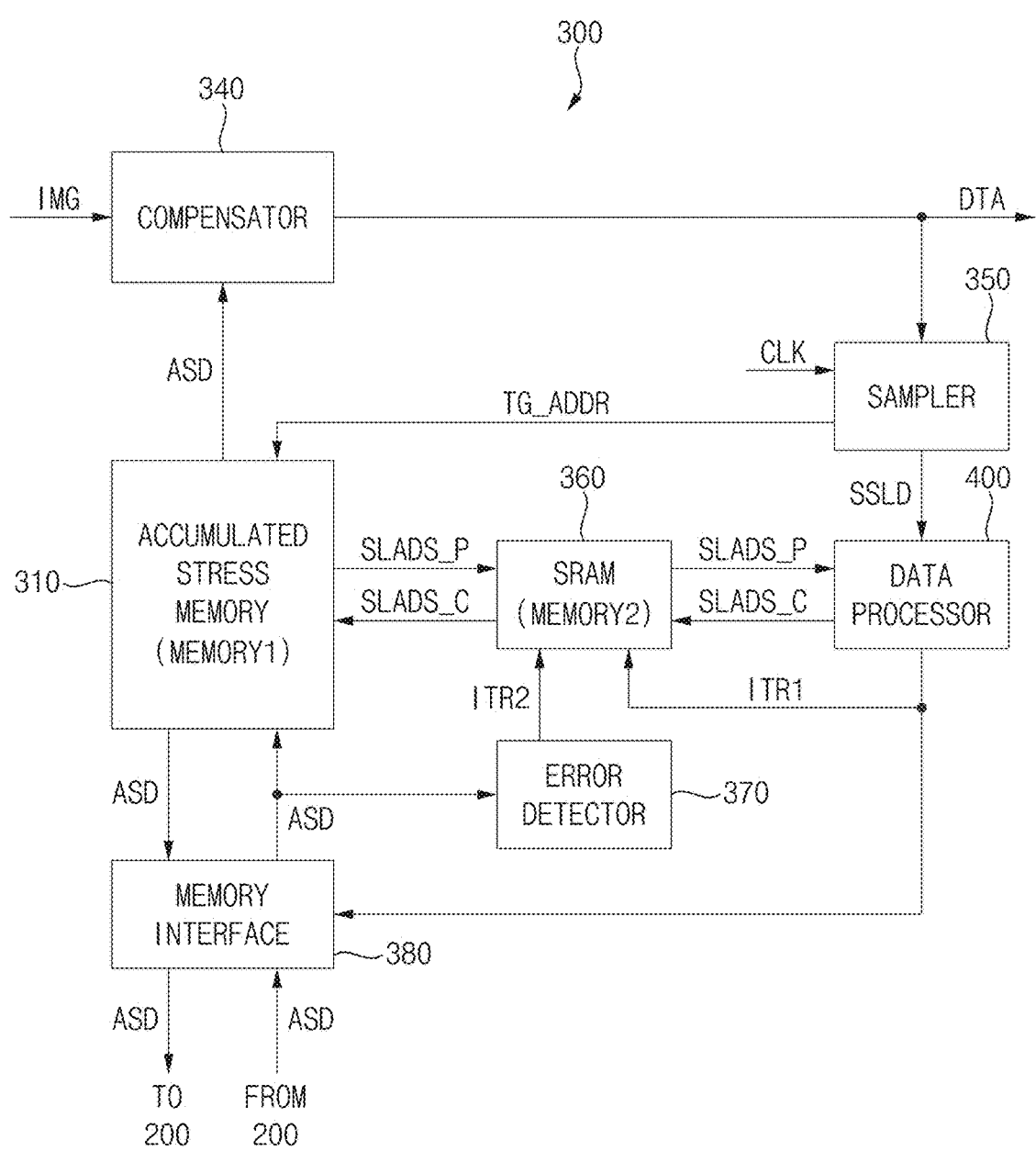
FIG. 5 is a block diagram illustrating an embodiment of the compensation circuit in the display driver integrated circuit in FIG. 1.
FIG. 6 illustrates an embodiment of a previous slice accumulated data set and a present slice accumulated data set in FIG. 5.

FIG. 5 is a block diagram illustrating an embodiment of the compensation circuit in the display driver integrated circuit in FIG. 1, and FIG. 6 illustrates an embodiment of a previous slice accumulated data set and a present slice accumulated data set in FIG. 5.

Referring to FIG. 6, a previous slice accumulated data set SLADS_P may include a previous slice accumulated data SLAD_P, a previous maximum value MAX_P and a previous checksum CS_P. The previous slice accumulated data SLAD_P may include degradation values of pixels included in associated slice data. The previous maximum value MAX_P may indicate a maximum value from among the degradation values in the previous slice accumulated data SLAD_P. The previous checksum CS_P may be generated based on the degradation values in the previous slice accumulated data SLAD_P. In addition, a present slice accumulated data set (i.e., a current slice accumulated data set) SLADS_C may include a current slice accumulated data SLAD_C, a current maximum value MAX_C and a current checksum CS_C. The current slice accumulated data SLAD_C may include degradation values of pixels included in a selected slice data. The current maximum value MAX_C may indicate a maximum value from among degradation values in the current slice accumulated data SLAD_C. The current checksum CS_C may be generated based on the degradation values in the current slice accumulated data SLAD_C.

Referring back to FIG. 5, the compensation circuit 300 may include an accumulated stress memory (i.e., a first memory) 310, a compensator 340, a sampler 350, a data processor 400, a static random access memory ("SRAM") (i.e., a second memory) 360, an error detector 370 and a memory interface 380.

When the display driver integrated circuit 105 is powered-on, the memory interface 380 may provide the first memory 310 with the accumulated stress data ASD loaded from the third memory 200 in FIG. 1, and may perform a back-up operation to store the accumulated stress data ASD stored in the first memory 310, in the third memory 200 with a predetermined period.

The first memory 310 may store the accumulated stress data ASD loaded from the third memory 200 and may provide the accumulated stress data ASD to the compensator 340.

The compensator 340 may generate the output data DTA for image display by compensating the input image data IMG based on the accumulated stress data ASD associated with compensating degradation of a plurality of pixels. The compensator 340 may compensate the input image data IMG based on image sticking compensation ("ISC").

In a degradation compensation technique (e.g., ISC), stress data (stress profile or accumulated data) may be generated by accumulating a driving time and/or a grayscale value for each pixel, compensation data may be generated based on a predetermined lifetime curve and the stress data, and a voltage value may be compensated based on the generated compensation data. The predetermined lifetime curve represents degradation degree according to lapse of time and the compensation data along with the stress data may be stored in the form of a separate lookup table in the compensator 340.

The sampler 350 may select a slice data by a slice unit, from each of a plurality of frames of the input image data IMG based on the clock signal CLK and may provide the selected slice data SSLD to the data processor 400. In addition, the sampler 350 may provide the data processor 400 with a target address TG_ADDR associated with the selected slice data SSLD.

The first memory 310, in response to the target address, may provide the previous slice accumulated data set SLADS_P to the second memory 360 and the second memory 360 may provide the previous slice accumulated data set SLADS_P to the data processor 400.

The data processor 400 may generate the present slice accumulated data SLAD_C of a present slice accumulated data set SLADS_C associated with a selected frame from the plurality of frames by summing the selected slice data SSLD with the previous slice accumulated data SLAD_P of the previous slice accumulated data set SLADS_P associated with the selected frame with the selected slice data SSLD, may select a maximum value from among degradation values of pixels included in the present slice accumulated data SLAD_C as the present maximum value MAX_C, may determine whether the present slice accumulated data SLAD_C is abnormal based on comparing the previous maximum value MAX_P of the previous slice accumulated data set SLADS_P with the present maximum value MAX_C, and may selectively update the previous slice accumulated data set SLADS_P by selectively storing the present slice accumulated data set SLADS_C in the first memory 310 based on the determination.

The data processor 400 may provide the present slice accumulated data set SLADS_C to the second memory 360. When the present maximum value MAX_C of the present slice accumulated data set SLADS_C is normal, the second memory 360 may update the previous slice accumulated data set SLADS_P stored in the first memory 310 with the present slice accumulated data set SLADS_C by providing the present slice accumulated data set SLADS_C to the first memory 310.

The data processor 400 may selectively withhold operations of the second memory 360 and the memory interface 380 by providing the second memory 360 and the memory interface 380 with a first interrupt signal ITR1 indicating whether the present maximum value MAX_C of the present slice accumulated data set SLADS_C is abnormal.

The second memory 360 may provide the present slice accumulated data set SLADS_C to the first memory 310 in response to the first interrupt signal ITR1 indicating that the present maximum value MAX_C is normal. The second memory 360 may withhold (i.e., stop) operation without providing the present slice accumulated data set SLADS_C to the first memory 310 in response to the first interrupt signal ITR1 indicating that the present maximum value MAX_C is abnormal.

In response to the first interrupt signal ITR1 indicating that the present maximum value MAX_C is normal, the memory interface 380 may perform a back-up operation to store the accumulated stress data ASD stored in the first memory 310, in the third memory 200 with a predetermined period.

In response to the first interrupt signal ITR1 indicating that the present maximum value MAX_C is abnormal, the memory interface 380 may skip the back-up operation to store the accumulated stress data ASD stored in the first memory 310, in the third memory 200.

When the display driver integrated circuit 105 is powered-on, the error detector 370 may determine whether the accumulated stress data ASD loaded from the third memory 200 is abnormal based on a maximum value and a checksum in the accumulated stress data ASD loaded from the third memory 200 and may provide the second memory 360 with a second interrupt signal ITR2 indicating whether the accumulated stress data ASD is abnormal.

In response to the second interrupt signal ITR2 indicating that the accumulated stress data ASD is abnormal, the second memory 360 may withhold an operation.

Therefore, when defects occur in the accumulated stress data ASD stored in the first memory 310 due to electro static discharge ("ESD"), a memory access failure, a hardware fail, etc., the data processor 400 may check integrity of the accumulated stress data ASD based on a change of maximum value of slice data selected from the accumulated stress data ASD and may withhold updating slice accumulated data in the first memory 310 or may withhold back-up operation to store the accumulated stress data ASD in the third memory 200 when it is determined that the accumulated stress data ASD is abnormal (i.e., the defects occur in the accumulated stress data ASD). When it is determined that the accumulated stress data ASD is abnormal, after the display device 100 is powered-off and then powered-on, the accumulated stress data ASD is loaded to the first memory 310 from the third memory 200 and the compensation circuit 300 may perform the accumulation and compensation operation based on normal slice accumulated data.

Figure 7:
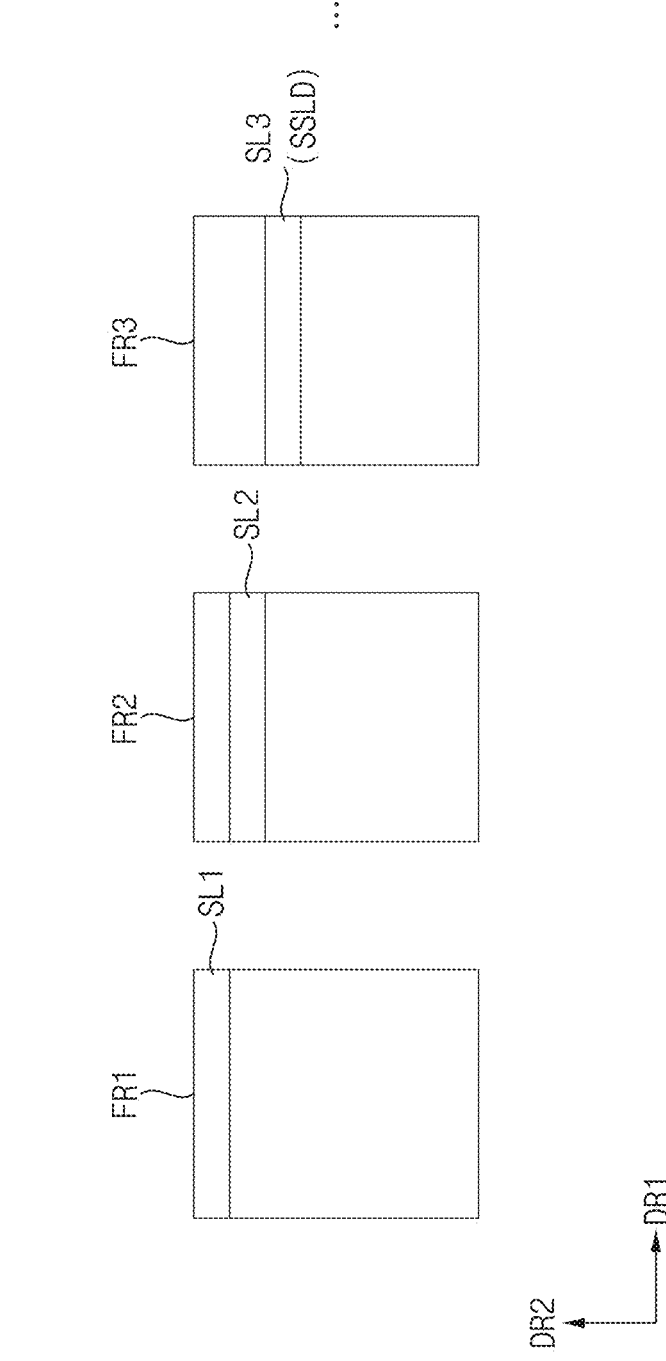
FIG. 7 illustrates an embodiment that the sampler in FIG. 6 selects a slice data from among a plurality of frames.

FIG. 7 illustrates an embodiment that the sampler in FIG. 6 selects a slice data from among a plurality of frames.

Referring to FIG. 7, each of a plurality of frames FR1, FR2, FR3, etc., may include data disposed in a first direction DR1 and a second direction DR2 and the sampler 350 may select a respective one of slices SL1, SL2, SL3, etc., from among each of the plurality of frames FR1, FR2, FR3, etc. Each of the slices SL1, SL2, SL3, etc., may include data corresponding to at least one pixel row in the first direction DR1 in respective one of the plurality of frames FR1, FR2, FR3, etc. In FIG. 7, assuming that the slice data SL3 in the frame FR3 is provided as the selected slice data SSLD. That is, the slice unit may include data corresponding to at least one pixel row in the first direction DR1 in respective one of the plurality of frames FR1, FR2, FR3, etc.

Figure 8:
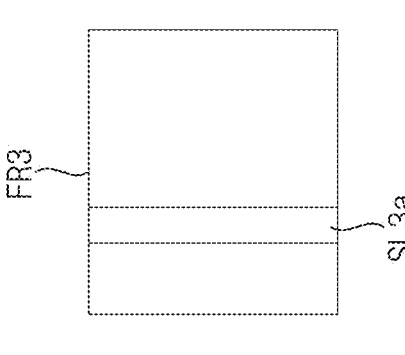
FIG. 8 illustrates an embodiment that the sampler in FIG. 6 selects a slice data from among a plurality of frames.
Figure 8:
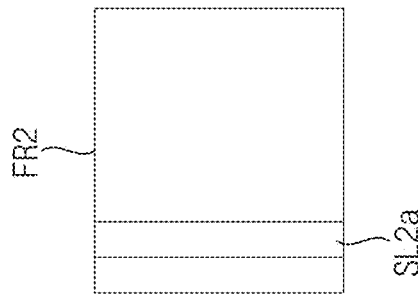
Figure 8:
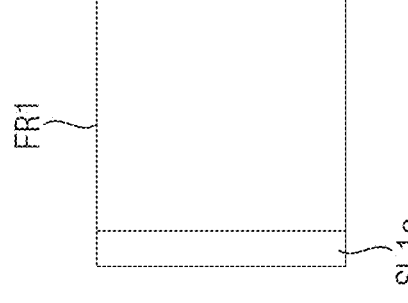
Figure 8:
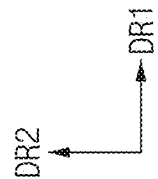

FIG. 8 illustrates an embodiment that the sampler in FIG. 6 selects a slice data from among a plurality of frames.

Referring to FIG. 8, each of a plurality of frames FR1, FR2, FR3, etc., may include data disposed in a first direction DR1 and a second direction DR2 and the sampler 350 may select a respective one of slices SL1a, SL2a, SL3a, etc., from among each of the plurality of frames FR1, FR2, FR3, etc. Each of the slices SL1a, SL2a, SL3a, etc., may include data corresponding to at least one pixel column in the second direction DR2 in respective one of the plurality of frames FR1, FR2, FR3, etc. That is, the slice unit may include data corresponding to at least one pixel column in the second direction DR2 in respective one of the plurality of frames FR1, FR2, FR3, etc.

Figure 9:
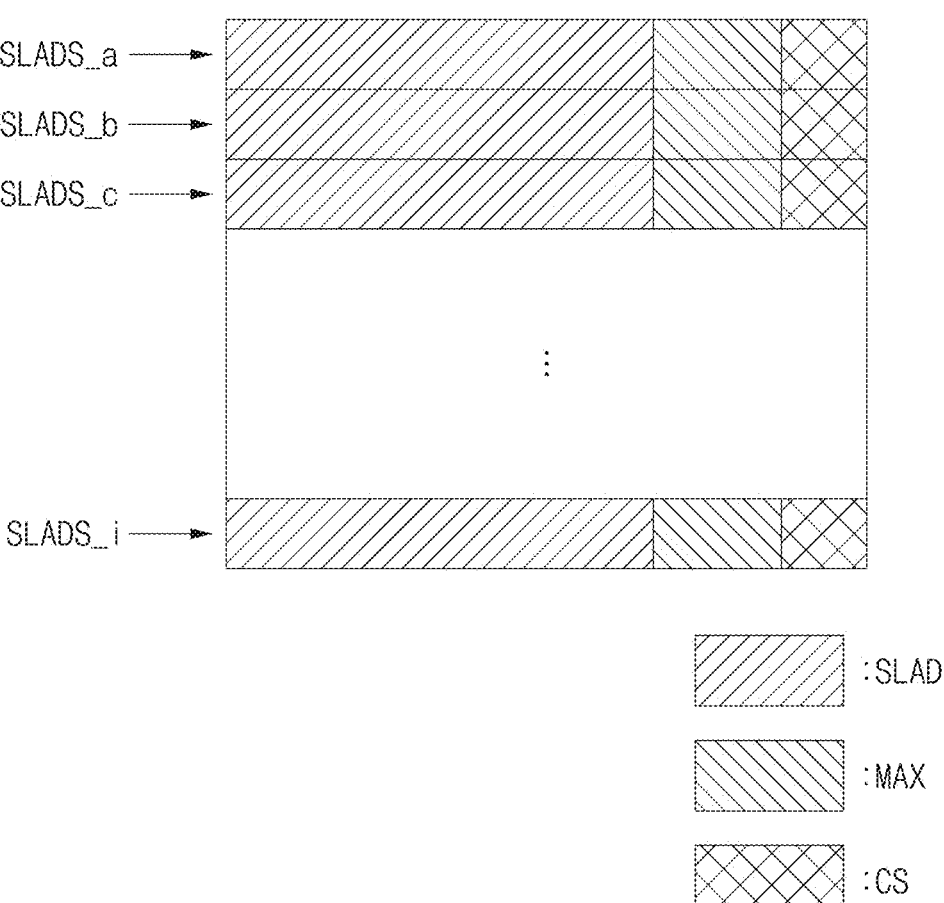
FIG. 9 illustrates an embodiment of the first memory in the compensation circuit of FIG. 5.

FIG. 9 illustrates an embodiment of the first memory in the compensation circuit of FIG. 5.

Referring to FIG. 9, the first memory 310 may store a plurality of slice accumulated data sets SLADS_a, SLADS_b, SLADS_c, . . . , SLADS_i which are selected from each of the plurality of frames FR1, FR2, FR3, etc., by a slice unit and are accumulated, and each of the plurality of slice accumulated data sets SLADS_a, SLADS_b, SLADS_c, . . . , SLADS_i may include a slice accumulated data SLAD, a maximum value MAX which is the greatest among degradation values of the slice accumulated data SLAD and a checksum CS that is generated based on the degradation values of the slice accumulated data SLAD.

When a degradation value among the degradation values of at least one of the slice accumulated data SLAD of the plurality of slice accumulated data sets SLADS_a, SLADS_b, SLADS_c, . . . , SLADS_i is relatively great due to ESD, the degradation value may affect the maximum value MAX and defects occur in the accumulated stress data ASD. The accumulated stress data ASD is updated by accumulating degradation amount to the previous stress data at a present time point. Because the compensator 340 in FIG. 5 compensates the input image data IMG based on the accumulated stress data ASD having defects, mis-compensation for degradation may continuously occur.

However, the compensation circuit 300 in embodiments, may determine whether each of the plurality of slice accumulated data sets SLADS_a, SLADS_b, SLADS_c, . . . , SLADS_i is abnormal based on comparing a previous maximum value of each of the plurality of slice accumulated data sets SLADS_a, SLADS_b, SLADS_c, . . . , SLADS_i with a present maximum value of respective one of the plurality of slice accumulated data sets SLADS_a, SLADS_b, SLADS_c, . . . , SLADS_i and does not store a slice accumulated data set having defects in the first memory 310. Therefore, the compensation circuit 300 may prevent the accumulated stress data ASD from being affected by abnormal degradation value.

Figure 10:
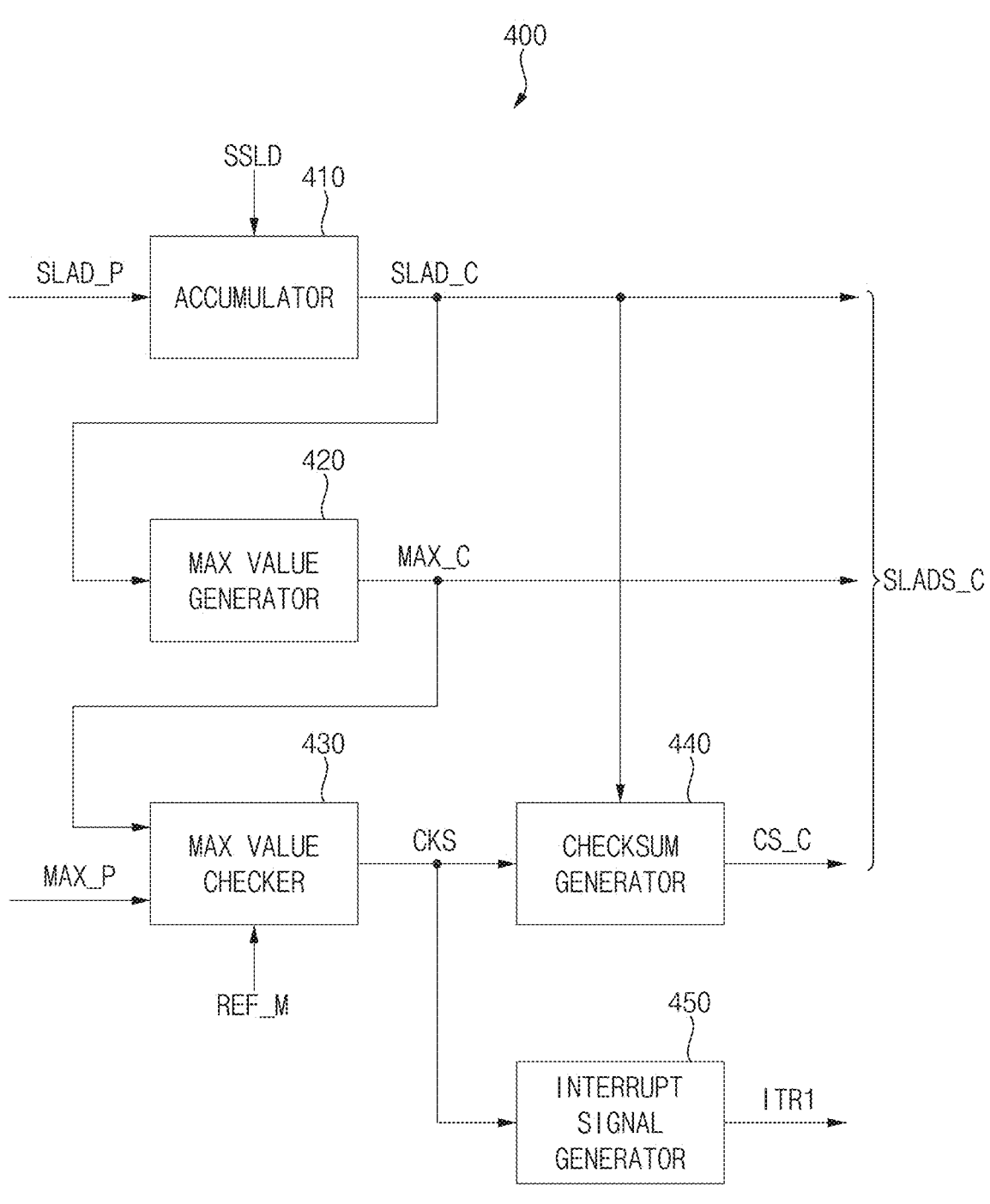
FIG. 10 is a block diagram illustrating an embodiment of the data processor in the compensation circuit of FIG. 5.

FIG. 10 is a block diagram illustrating an embodiment of the data processor in the compensation circuit of FIG. 5.

Referring to FIG. 10, the data processor 400 may include an accumulator 410, a maximum MAX value generator 420, a maximum MAX value checker 430, a checksum generator 440 and an interrupt signal generator 450.

The accumulator 410 may generate the present slice accumulated data SLAD_C by summing the selected slice data SSLD with the previous slice accumulated data SLAD_P.

The maximum value generator 420 may select a maximum value from among the degradation values of the pixels included in the present slice accumulated data SLAD_C as the present maximum value MAX_C.

The maximum value checker 430 may generate a difference value between the present maximum value MAX_C and the previous maximum value MAX_P, may compare the difference value with a reference value REF_M and generate a check signal CKS indicating whether the present slice accumulated data SLAD_C is abnormal based on the comparison.

The reference value REF_M may be a maximum accumulated value which degradation values may have, and may represent a degradation amount with which a corresponding block may be maximally degraded during an update period of the maximum degradation value (e.g., during one frame).

In an embodiment, the maximum value checker 430 may compare the present maximum value MAX_C with a first reference value and may generate the check signal CKS indicating whether the present maximum value MAX_C is abnormal based on the comparison. The first reference value may be greater than the reference value REF_M.

The checksum generator 440 may generate a present checksum CS_C of the present slice accumulated data set SLADS_C by performing a cyclic redundancy check ("CRC") operation on the degradation values of the pixels included in the present slice accumulated data SLAD_C.

The interrupt signal generator 450 may generate the first interrupt signal ITR1 that is activated when the present maximum value MAX_C is abnormal, based on the check signal CKS.

The maximum value checker 430 may output the check signal CKS with a first logic level (e.g., a logic relatively low level) in response to the difference value being equal to or smaller than the reference value REF_M, and the checksum generator 440 may perform the CRC operation on degradation values of the pixels in response to the check signal CKS having the first logic level and may output the present checksum CS_C.

The maximum value checker 430 may output the check signal CKS with a second logic level (e.g., a logic relatively high level) different from the first logic level in response to the difference value being greater than the reference value REF_M, and the checksum generator 440 may skip performing the CRC operation on degradation values of the pixels in response to the check signal CKS having the second logic level.

The present slice accumulated data SLAD_C, the present maximum value MAX_C and the present checksum CS_C may be provided to the second memory 360 in FIG. 5 as the present slice accumulated data set SLADS_C.

Figure 11:
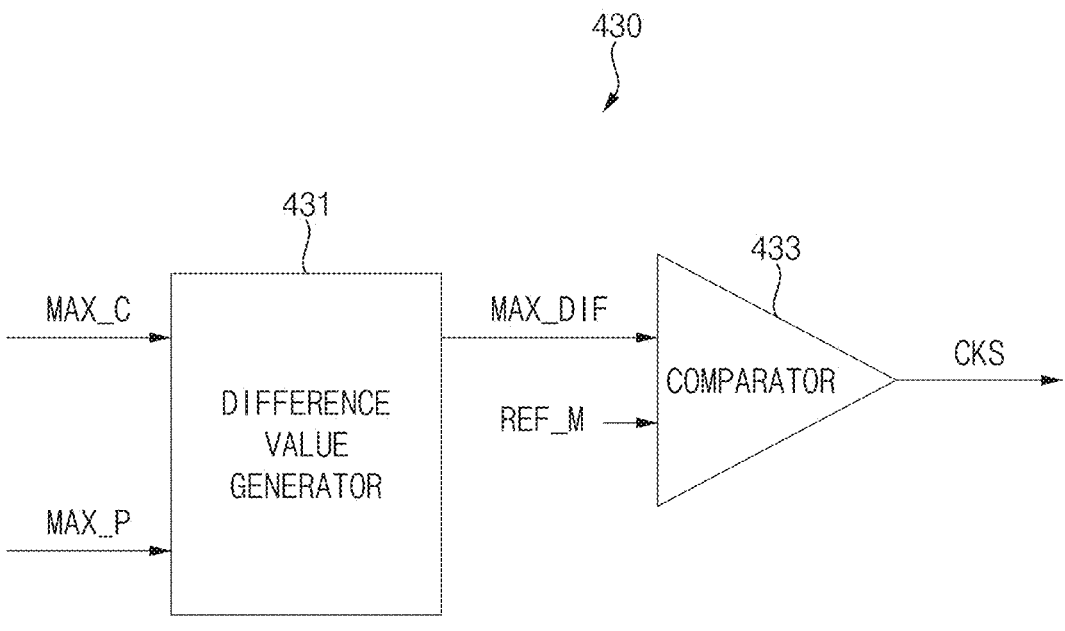
FIG. 11 is a block diagram illustrating an embodiment of the maximum value checker in FIG. 10.

FIG. 11 is a block diagram illustrating an embodiment of the maximum value checker in FIG. 10.

Referring to FIG. 11, the maximum value checker 430 may include a difference value generator 431 and a comparator 433.

The difference value generator 431 may generate a difference value MAX_DIF by subtracting the previous maximum value MAX_P from the present maximum value MAX_C. The comparator 433 may generate the check signal CKS by comparing the difference value MAX_DIF with the reference value REF_M and may determine a logic level of the check signal CKS based on a result of the comparison. When the difference value MAX_DIF is equal or smaller than the reference value REF_M, the comparator 433 may output the check signal CKS having a first logic level. When the difference value MAX_DIF is greater than the reference value REF_M, the comparator 433 may output the check signal CKS having a second logic level.

Figure 12:
FIG. 12 illustrates an embodiment of a slice accumulated data set.

FIG. 12 illustrates an embodiment of a slice accumulated data set.

Referring to FIG. 12, a slice accumulated data set SLADS may include the slice accumulated data SLAD, the maximum value MAX, a mean value MV and the checksum CS.

The data processor 400 of FIG. 10 may generate the mean value MV by averaging the degradation values in the slice accumulated data SLAD. That is, the data processor 400 may generate the mean value MV by dividing a summed value of the degradation values by a number of the degradation values. In this case, the data processor 400 may further include a mean value generator.

The data processor 400 may determine whether the slice accumulated data SLAD abnormal based on a difference between mean values of the previous slice accumulated data and the present slice accumulated data or based on a difference between the maximum values of the previous slice accumulated data and the present slice accumulated data and the difference between the mean values.

Figure 13:
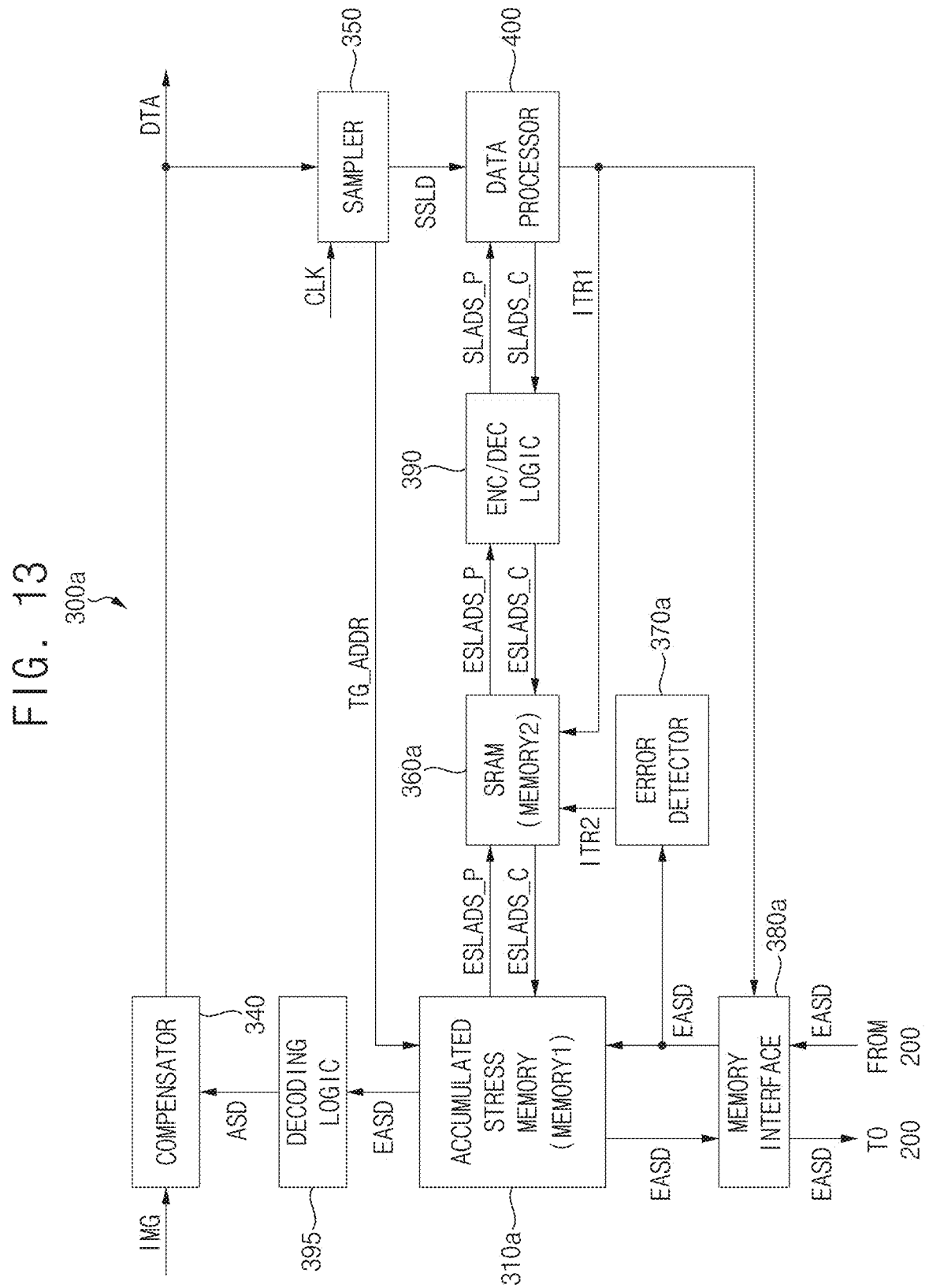
FIG. 13 is a block diagram illustrating an embodiment of a compensation circuit in the display driver integrated circuit in FIG. 1.

FIG. 13 is a block diagram illustrating an embodiment of a compensation circuit in the display driver integrated circuit in FIG. 1.

Referring to FIG. 13, a compensation circuit 300a may include an accumulated stress memory (i.e., a first memory) 310a, a compensator 340, a sampler 350, a data processor 400, an SRAM (i.e., a second memory) 360a, an error detector 370a, a memory interface 380a, an encoding/decoding ENC/DEC logic 390 and a decoding logic 395.

When the display driver integrated circuit 105 is powered-on, the memory interface 380a may provide the first memory 310a with an encoded accumulated stress data EASD loaded from the third memory 200 in FIG. 1, and may perform a back-up operation to store the encoded accumulated stress data EASD stored in the first memory 310a, in the third memory 200 with a predetermined period.

The first memory 310a may store the encoded accumulated stress data EASD loaded from the third memory 200 and may provide the encoded accumulated stress data EASD to the decoding logic 395.

The decoding logic 395 may generate the accumulated stress data ASD by decoding the encoded accumulated stress data EASD and may provide the accumulated stress data ASD to the compensator 340.

The compensator 340 may generate the output data DTA for image display by compensating the input image data IMG based on the accumulated stress data ASD associated with compensating degradation of a plurality of pixels. The compensator 340 may compensate the input image data IMG based on ISC.

The sampler 350 may select a slice data by a slice unit, from each of a plurality of frames of the input image data IMG based on the clock signal CLK and may provide the selected slice data SSLD to the data processor 400. In addition, the sampler 350 may provide the data processor 400 with a target address TG_ADDR associated with the selected slice data SSLD.

The first memory 310a, in response to the target address, may provide an encoded previous slice accumulated data set ESLADS_P to the second memory 360a and the second memory 360a may provide the encoded previous slice accumulated data set ESLADS_P to the encoding/decoding logic 390.

The encoding/decoding logic 390 may generate the previous slice accumulated data set SLADS_P by decoding the encoded previous slice accumulated data set ESLADS_P and may provide the previous slice accumulated data set SLADS_P to the data processor 400.

The data processor 400 may generate the present slice accumulated data SLAD_C of a present slice accumulated data set SLADS_C associated with a selected frame from the plurality of frames by summing the selected slice data SSLD with the previous slice accumulated data SLAD_P of the previous slice accumulated data set SLADS_P associated with the selected frame with the selected slice data SSLD, may select a maximum value from among degradation values of pixels included in the present slice accumulated data SLAD_C as the present maximum value MAX_C, may determine whether the present slice accumulated data SLAD_C is abnormal based on comparing the previous maximum value MAX_P of the previous slice accumulated data set SLADS_P with the present maximum value MAX_C, and may selectively update the previous slice accumulated data set SLADS_P by selectively storing the present slice accumulated data set SLADS_C in the first memory 310 based on the determination.

The data processor 400 may provide the present slice accumulated data set SLADS_C to the encoding/decoding logic 390 and the encoding/decoding logic 390 may generate an encoded present slice accumulated data set ESLADS_C by encoding the present slice accumulated data set SLADS_C and may provide the encoded present slice accumulated data set ESLADS_C to the second memory 360a. When a present maximum value of the encoded present slice accumulated data set ESLADS_C is normal, the second memory 360 may update the encoded previous slice accumulated data set ESLADS_P stored in the first memory 310 with the encoded present slice accumulated data set ESLADS_C by providing the encoded present slice accumulated data set ESLADS_C to the first memory 310a.

The data processor 400 may selectively withhold operations of the second memory 360a and the memory interface 380a by providing the second memory 360a and the memory interface 380a with a first interrupt signal ITR1 indicating whether the present maximum value MAX_C of the present slice accumulated data set SLADS_C is abnormal.

The second memory 360a may provide the encoded present slice accumulated data set ESLADS_C to the first memory 310a in response to the first interrupt signal ITR1 indicating that the present maximum value MAX_C is normal. The second memory 360a may withhold (i.e., stop) operation without providing encoded present slice accumulated data set ESLADS_C to the first memory 310a in response to the first interrupt signal ITR1 indicating that the present maximum value MAX_C is abnormal.

In response to the first interrupt signal ITR1 indicating that the present maximum value MAX_C is normal, the memory interface 380a may perform a back-up operation to store the encoded accumulated stress data EASD stored in the first memory 310a, in the third memory 200 with a predetermined period.

In response to the first interrupt signal ITR1 indicating that the present maximum value MAX_C is abnormal, the memory interface 380a may skip the back-up operation to store the encoded accumulated stress data ASD stored in the first memory 310a, in the third memory 200.

When the display driver integrated circuit 105 is powered-on, the error detector 370a may determine whether the encoded accumulated stress data EASD loaded from the third memory 200 is abnormal based on a maximum value and a checksum in the encoded accumulated stress data EASD loaded from the third memory 200 and may provide the second memory 360a with a second interrupt signal ITR2 indicating whether the encoded accumulated stress data EASD is abnormal.

In response to the second interrupt signal ITR2 indicating that the encoded accumulated stress data EASD is abnormal, the second memory 360a may withhold an operation.

Therefore, when defects occur in the encoded accumulated stress data EASD stored in the first memory 310 due to ESD, a memory access failure, a hardware fail, etc., the data processor 400a may check integrity of the encoded accumulated stress data EASD based on a change of maximum value of slice data selected from the encoded accumulated stress data EASD and may withhold updating slice accumulated data in the first memory 310a or may withhold back-up operation to store the encoded accumulated stress data EASD in the third memory 200 when it is determined that the encoded accumulated stress data EASD is abnormal (i.e., the defects occur in the encoded accumulated stress data EASD). When it is determined that the encoded accumulated stress data EASD is abnormal, after the display device 100 is powered-off and then powered-on, the encoded accumulated stress data EASD is loaded to the first memory 310a from the third memory 200 and the compensation circuit 300a may perform the accumulation and compensation operation based on normal slice accumulated data.

Figure 14:
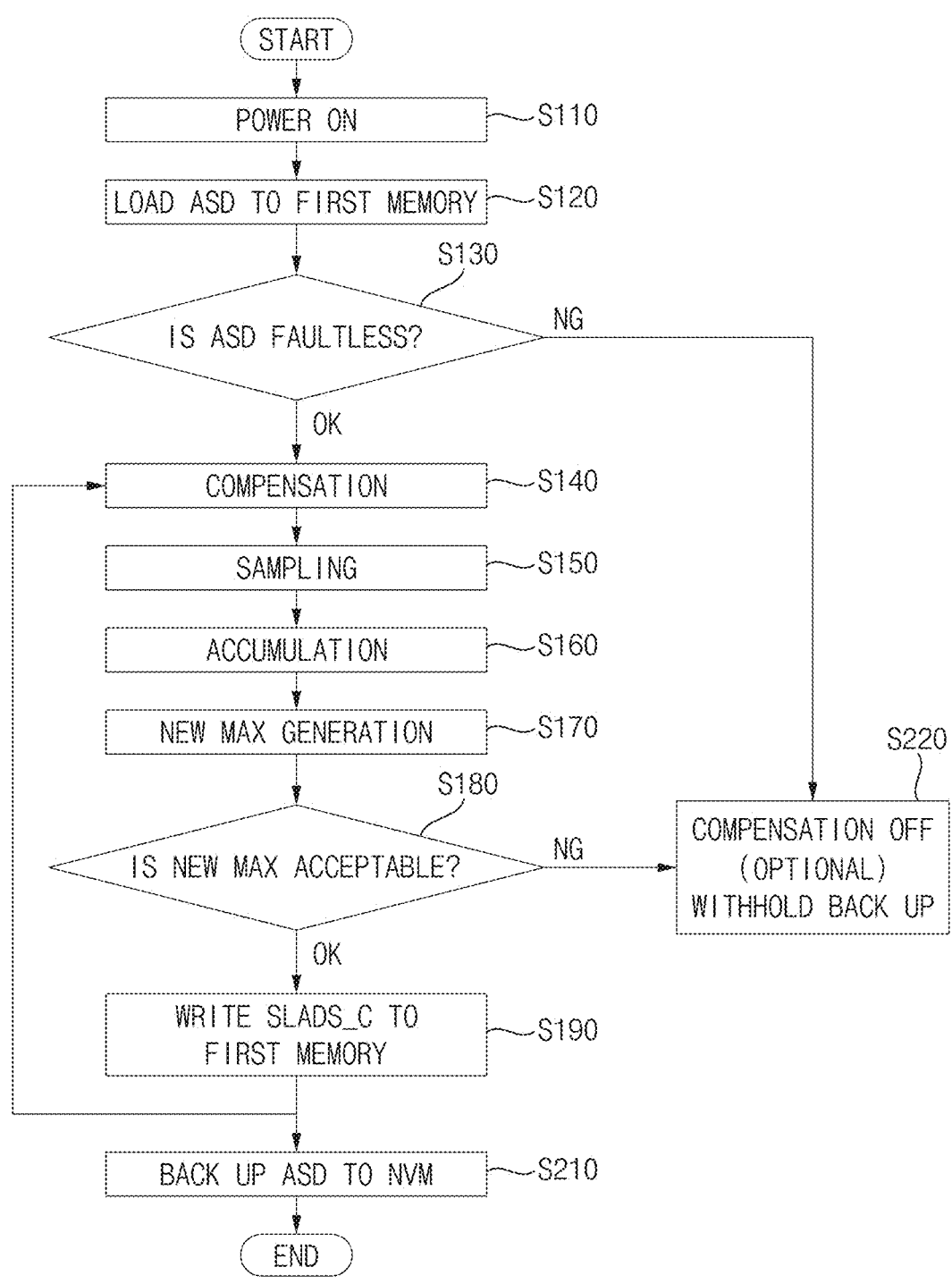
FIG. 14 is a flow chart illustrating an embodiment of a method of driving a display device.

FIG. 14 is a flow chart illustrating an embodiment of a method of driving a display device.

Referring to FIGS. 1, 5 through 12 and 14, in a method of driving a display device 100 in embodiments, the display device 100 is powered-on (operation S110), and the accumulated stress data ASD for compensating degradation of a plurality of pixels is loaded to the first memory 310 (operation S120).

It is determined whether the accumulated stress data ASD is faultless based on maximum values and checksums of the accumulated stress data ASD (operation S130). When it is determined that the accumulated stress data ASD is not faultless (NG in operation S130), compensation operation is withheld (compensation off) and a back-up operation to store the accumulated stress data ASD in the third memory 200 is withheld (operation S220).

When it is determined that the accumulated stress data ASD is faultless (OK in operation S130), the compensator 340 generates the output data DTA by compensating the input image data IMG based on the accumulated stress data ASD (i.e., compensation) (operation S140).

The sampler 350 selects a slice data by a slice unit, from each of a plurality of frames of the input image data IMG and provides the selected slice data SSLD to the data processor 400 (i.e., sampling) (operation S150), and the data processor 400 generate the present slice accumulated data SLAD_C of the present slice accumulated data set SLADS_C by summing the selected slice data SSLD with the previous slice accumulated data SLAD_P of the previous slice accumulated data set SLADS_P (i.e., accumulation) (operation S160). The data processor 400 selects a maximum value from among degradation values of pixels included in the present slice accumulated data SLAD_C as the present maximum value MAX_C (i.e., new max generation) (operation S170).

The data processor 400 determines whether the present maximum value MAX_C is abnormal based on comparing the previous maximum value MAX_P with the present maximum value MAX_C (i.e., it is determined whether the new max is acceptable) (operation S180).

When it is determined that the present maximum value MAX_C is abnormal (NG in operation S180), compensation operation is withheld (compensation off) and a back-up operation to store the accumulated stress data ASD in the third memory 200 is withheld (operation S220).

When it is determined that the present maximum value MAX_C is not abnormal (OK in operation S180), the present slice accumulated data set SLADS_C is stored (i.e., written) in the first memory 310 (operation S190). The memory interface 380 backs-up the accumulated stress data ASD in the third memory 200 (operation S210) while the process returns to the operation (S140).

Figure 15:
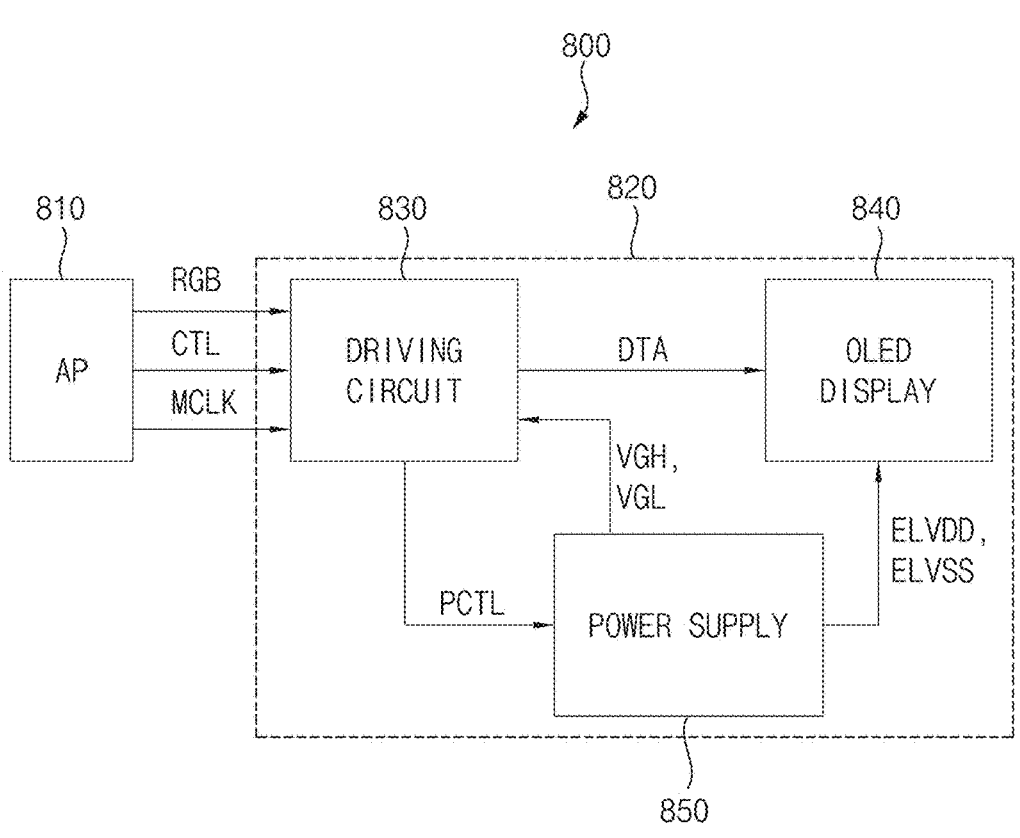
FIG. 15 is a block diagram illustrating an embodiment of a display system.

FIG. 15 is a block diagram illustrating an embodiment of a display system.

Referring to FIG. 15, a display system 800 may include an application processor 810 and a display device 820. The display device 820 may include a display driver integrated circuit 830, a display panel (i.e., an OLED display) 840 and a power supply 850.

The power supply 850 may provide a higher power supply voltage ELVDD, a lower power supply voltage ELVSS to the display panel 840 in response to a power control signal PCTL from the display driver integrated circuit (also referred to as a driving circuit) 830.

The display system 800 may be a portable device such as a laptop, a cellular phone, a smart phone, a personal computer ("PC"), a personal digital assistant ("PDA"), a portable multi-media player ("PMP"), a MP3 player, a navigation system, etc.

The application processor 810 provides an image signal RGB, a control signal CTL and a main clock signal MCLK to the display device 820, and the display driver integrated circuit 830 may provide data DTA to the display panel 840.

The display driver integrated circuit 830, the display panel 840 and the power supply 850 are substantially same as the display driver integrated circuit 105, the display panel 110 the power supply 180, respectively.

Figure 16:
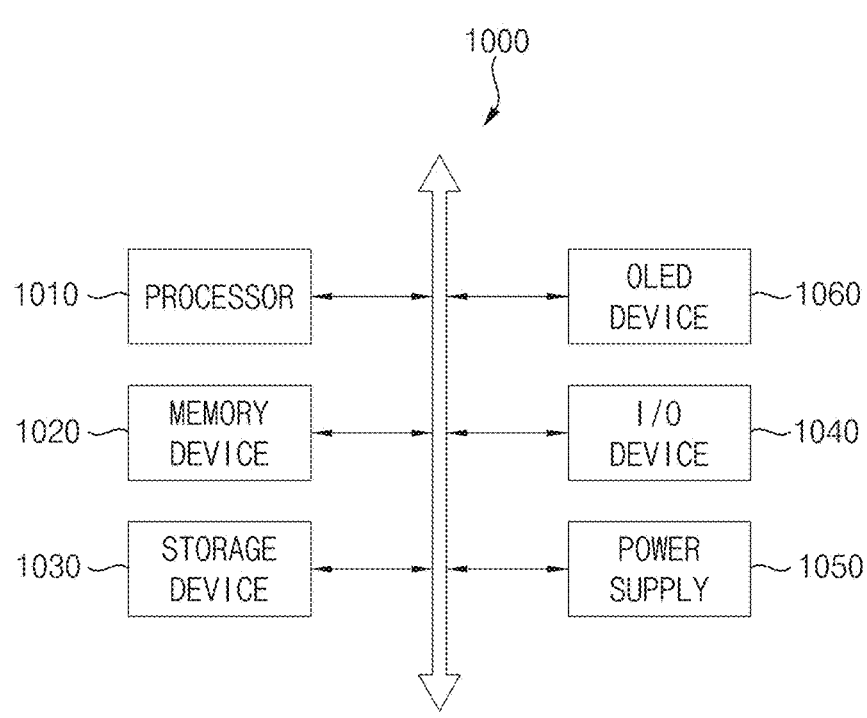
FIG. 16 a block diagram illustrating an embodiment of an electronic device including an OLED device.
Figure 17:
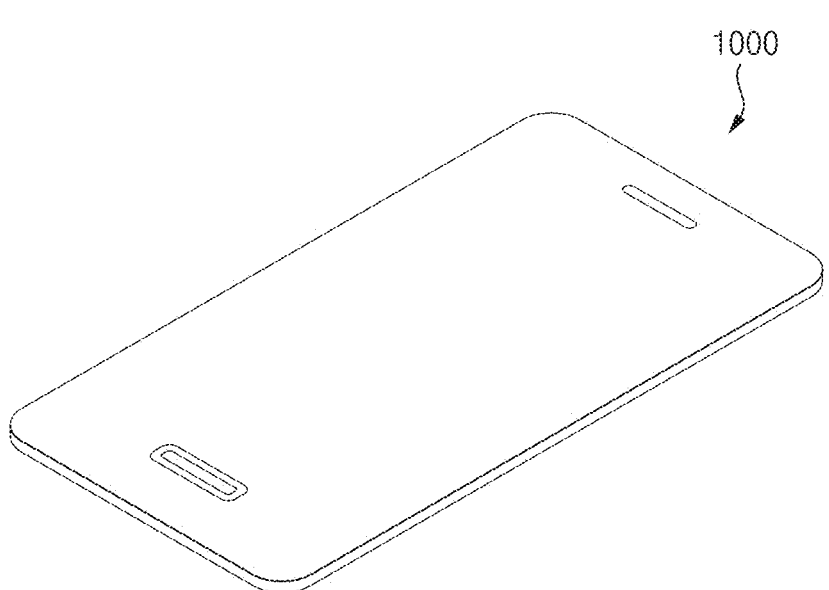
FIG. 17 is a diagram illustrating an embodiment in which the electronic device of FIG. 16 is implemented as a smart phone.

FIG. 16 a block diagram illustrating an embodiment of an electronic device including an OLED device. FIG. 17 is a diagram illustrating an embodiment in which the electronic device of FIG. 16 is implemented as a smart phone.

Referring to FIGS. 16 and 17, an electronic device 1000 may include a processor 1010, a memory device 1020, a storage device 1030, an input/output ("I/O") device 1040, a power supply 1050, and an OLED display device 1060. The electronic device 1000 may further include a plurality of ports for communicating a video card, a sound card, a memory card, a universal serial bus ("USB") device, other electronic systems, etc. In an embodiment, as illustrated in FIG. 17, the electronic device 1000 may be implemented as a smart phone. However, the electronic device 1000 is not limited thereto. In an embodiment, the electronic device 1000 may be implemented as a cellular phone, a video phone, a smart pad, a smart watch, a tablet PC, a car navigation system, a computer monitor, a laptop, a head mounted display ("HMD") device, or the like.

The processor 1010 may perform various computing functions or tasks. The processor 1010 may be for example, a microprocessor, a central processing unit ("CPU"), etc. The processor 1010 may be connected to other components via an address bus, a control bus, a data bus, etc. Further, the processor 1010 may be coupled to an extended bus such as a peripheral component interconnection ("PCI") bus.

The memory device 1020 may store data for operations of the electronic device (also referred to as an electronic system) 1000. In an embodiment, the memory device 1020 may include at least one non-volatile memory device such as a flash memory device and/or at least one volatile memory device such as a dynamic random access memory ("DRAM") device, a static random access memory ("SRAM") device, a mobile dynamic random access memory ("mobile DRAM") device, etc.

The storage device 1030 may be, e.g., a solid state drive ("SSD") device, a hard disk drive ("HDD") device, a compact disc read-only memory ("CD-ROM") device, etc. The I/O device 1040 may be, e.g., an input device such as a keyboard, a keypad, a mouse, a touch screen, etc., and/or an output device such as a printer, a speaker, etc. The power supply 1050 may supply power for operations of the electronic system 1000. The OLED device 1060 may communicate with other components via the buses or other communication links.

The OLED device 1060 may employ the display device 100 of FIG. 1. Therefore, the OLED device 1060 may include a compensation circuit. The compensation circuit may select a slice data by a slice unit, from each of a plurality of frames of an input image data, may generate a present slice accumulated data of a present slice accumulated data set associated with a selected frame from the plurality of frames by summing the selected slice data with a previous slice accumulated data of a previous slice accumulated data set associated with the selected frame with the selected slice data, may select a maximum value from among degradation values of pixels included in the present slice accumulated data as a present maximum value, may determine whether the present slice accumulated data is abnormal based on comparing a previous maximum value of the previous slice accumulated data set with the present maximum value, may selectively update the previous slice accumulated data set by selectively storing the present slice accumulated data set in the first memory based on the determination and may perform a back-up operation to store the accumulated stress data in a nonvolatile memory device outside the compensation circuit.

The inventive concept may be applied to any display device or any electronic device including a display device. In an embodiment, the inventive concept may be applied to a television, a computer monitor, a laptop, a digital camera, a cellular phone, a smart phone, a personal digital assistant ("PDA"), a portable multimedia player ("PMP"), a MP3 player, a navigation system, a video phone, etc., for example.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the predetermined embodiments disclosed, and that modifications to the disclosed embodiments, as well as other embodiments, are intended to be included within the scope of the appended claims.

What is claimed is:

1. A display driver integrated circuit for driving a display panel including a plurality of pixels, the display driver integrated circuit comprising:

a first memory which stores accumulated stress data for compensating degradation of the plurality of pixels;

a compensating circuit which generates an output data for image display by compensating an input image data based on the accumulated stress data;

a sampling circuit which receives the input image data, selects a slice data by a unit of a slice, from each of a plurality of frames of the input image data based on a clock signal; and a data processing circuit which:

receives the selected slice data from the sampling circuit;

generates a present slice accumulated data of a present slice accumulated data set including degradation values of pixels and associated with a selected frame from the plurality of frames by summing the selected slice data with a previous slice accumulated data of a previous slice accumulated data set stored in the first memory and associated with the selected frame with the selected slice data, selects a maximum value from among the degradation values of the pixels included in the present slice accumulated data as a present maximum value;

determines whether the present slice accumulated data is abnormal based on comparing a previous maximum value of the previous slice accumulated data set with the present maximum value;

selectively updates the previous slice accumulated data set by selectively storing the present slice accumulated data set in the first memory based on the determination whether the present slice accumulated data is abnormal in a matter that at least a portion of the previous slice accumulated data set is updated with at least a portion of the present slice accumulated data set, and instructs the first memory to store the selectively updated previous slice accumulated data set as the accumulated stress data.

2. The display driver integrated circuit of claim 1, wherein the unit of the slice includes at least one pixel row from among the plurality of pixels or at least one pixel column from among the plurality of pixels.

3. The display driver integrated circuit of claim 1, wherein the data processing circuit includes:

an accumulating circuit which generates the present slice accumulated data by summing the selected slice data with the previous slice accumulated data;

a maximum value generating circuit which selects a maximum value from among the degradation values of the pixels included in the present slice accumulated data as the present maximum value;

a maximum value checking circuit which generates a difference value between the present maximum value and the previous maximum value, compares the difference value with a reference value, and generates a check signal indicating whether the present slice accumulated data is abnormal based on the comparison of the difference value with the reference value;

a checksum generator which generates a present checksum of the present slice accumulated data set by performing a cyclic redundancy check operation on the degradation values of the pixels included in the present slice accumulated data; and an interrupt signal generating circuit which generates an interrupt signal which is activated when the present maximum value is abnormal, based on the check signal.

4. The display driver integrated circuit of claim 3, wherein the maximum value checking circuit outputs the check signal with a first logic level in response to the difference value being equal to or smaller than the reference value, and wherein the checksum generator performs the cyclic redundancy check operation in response to the check signal having the first logic level.

5. The display driver integrated circuit of claim 3, wherein the maximum value checking circuit outputs the check signal with a second logic level different from a first logic level in response to the difference value being greater than the reference value, and wherein the checksum generator withholds performing the cyclic redundancy check operation in response to the check signal having the second logic level.

6. The display driver integrated circuit of claim 3, wherein the maximum value checking circuit includes:

a difference value generator which generates the difference value by subtracting the previous maximum value from the present maximum value; and a comparator which generates the check signal by comparing the difference value with the reference value, and determines a logic level of the check signal based on a result of the comparison of the difference value with the reference value.

7. The display driver integrated circuit of claim 1, further comprising a second memory, wherein, when the display driver integrated circuit is powered on, the accumulated stress data is loaded from a third memory disposed outside the display driver integrated circuit and are stored in the first memory, wherein the sampling circuit provides the first memory with a target address associated with the selected slice data, and wherein the first memory provides the previous slice accumulated data set to the second memory in response to the target address.

8. The display driver integrated circuit of claim 7, wherein the second memory provides the previous slice accumulated data set to the data processing circuit and provide the first memory with the present slice accumulated data set provided to the data processing circuit.

9. The display driver integrated circuit of claim 7, wherein the data processing circuit provides the second memory with an interrupt signal indicating whether the present maximum value is abnormal, and wherein the second memory withholds operation in response to the interrupt signal indicating that the present maximum value is abnormal.

10. The display driver integrated circuit of claim 7, further comprising an error detector, wherein the error detector:

determines whether the accumulated stress data loaded from the third memory is abnormal based on a maximum values and a checksum in the accumulated stress data loaded from the third memory; and provides the second memory with an interrupt signal indicating whether the accumulated stress data is abnormal.

11. The display driver integrated circuit of claim 10, wherein the second memory withholds operation in response to the interrupt signal indicating that the present maximum value is abnormal.

12. The display driver integrated circuit of claim 7, further comprising a memory interface, wherein the memory interface:

provides the first memory with the accumulated stress data loaded from the third memory; and performs a back-up operation to store the accumulated stress data stored in the first memory, in the third memory with a pre-determined period.

13. The display driver integrated circuit of claim 7, wherein:

the first memory is a nonvolatile memory device; and each of the second memory and the third memory is a volatile memory device.

14. The display driver integrated circuit of claim 1, further comprising:

a second memory;

an encoding/decoding logic circuit which:

provides an encoded present slice accumulated data set to the second memory by encoding the present slice accumulated data set provided from the data processing circuit; and provides the previous slice accumulated data set to the second memory by decoding an encoded previous slice accumulated data set provided from the first memory; and a decoding logic which provides the accumulated stress data to the compensating circuit by decoding the encoded accumulated stress data.

15. The display driver integrated circuit of claim 14, wherein, when the display driver integrated circuit is powered on, the encoded accumulated stress data is loaded from a third memory disposed outside the display driver integrated circuit and are stored in the first memory, wherein the sampling circuit provides the first memory with a target address associated with the selected slice data, and wherein the first memory provides the encoded previous slice accumulated data set to the encoding/decoding logic circuit in response to the target address.

16. The display driver integrated circuit of claim 14, wherein the data processing circuit provides the second memory with an interrupt signal indicating whether the present maximum value is abnormal, and wherein the second memory withholds operation in response to the interrupt signal indicating that the present maximum value is abnormal.

17. An electronic device comprising:

a display device comprising:

a display panel including a plurality of pixels; and a display driver integrated circuit which drives the display panel, the display driver integrated circuit including:

a first memory which stores accumulated stress data for compensating degradation of the plurality of pixels;

a compensating circuit which generates an output data for image display by compensating an input image data based on the accumulated stress data;

a sampling circuit which receives the input image data and selects a slice data by a unit of a slice, from each of a plurality of frames of the input image data based on a clock signal; and a data processing circuit which:

receives the selected slice data from the sampling circuit;

generates a present slice accumulated data of a present slice accumulated data set including degradation values of pixels and associated with a selected frame from the plurality of frames by summing the selected slice data with a previous slice stored in the first memory and accumulated data of a previous slice accumulated data set associated with the selected frame with the selected slice data, selects a maximum value from among the degradation values of the pixels included in the present slice accumulated data as a present maximum value;

determines whether the present slice accumulated data is abnormal based on comparing a previous maximum value of the previous slice accumulated data set with the present maximum value;

selectively updates the previous slice accumulated data set by selectively storing the present slice accumulated data set in the first memory based on the determination whether the present slice accumulated data is abnormal in a matter that at least a portion of the previous slice accumulated data set is updated with at least a portion of the present slice accumulated data set, and instructs the first memory to store the selectively updated previous slice accumulated data set as the accumulated stress data.

18. The electronic device of claim 17, wherein the unit of the slice includes at least one pixel row from among the plurality of pixels or at least one pixel column from among the plurality of pixels.

19. The electronic device of claim 17, wherein the data processing circuit includes:

an accumulating circuit which generates the present slice accumulated data by summing the selected slice data with the previous slice accumulated data;

a maximum value generating circuit which selects a maximum value from among the degradation values of the pixels included in the present slice accumulated data as the present maximum value;

a maximum value checking circuit which generates a difference value between the present maximum value and the previous maximum value, compares the difference value with a reference value, and generates a check signal indicating whether the present slice accumulated data is abnormal based on the comparison of the difference value with the reference value;

a checksum generator which generates a present checksum of the present slice accumulated data set by performing a cyclic redundancy check operation on the degradation values of the pixels included in the present slice accumulated data; and an interrupt signal generating circuit which generates an interrupt signal which is activated when the present slice accumulated data is abnormal, based on the check signal.

20. The electronic device of claim 17, wherein the display driver integrated circuit further includes:

a second memory;

an error detector; and an encoding/decoding logic circuit which:

provides an encoded present slice accumulated data set to the second memory by encoding the present slice accumulated data set provided from the data processing circuit; and provides the previous slice accumulated data set to the second memory by decoding an encoded previous slice accumulated data set provided from the first memory, wherein the sampling circuit provides the first memory with a target address associated with the selected slice data, wherein the first memory provides the encoded previous slice accumulated data set to the encoding/decoding logic circuit in response to the target address, wherein the second memory provides the previous slice accumulated data set to the data processing circuit, and provides the first memory with the present slice accumulated data set provided to the data processing circuit, wherein the data processing circuit provides the second memory with a first interrupt signal indicating whether the present maximum value is abnormal, and the second memory withholds operation in response to the first interrupt signal indicating that the present maximum value is abnormal, wherein the error detector determines whether the accumulated stress data loaded from a third memory is abnormal based on a maximum value and a checksum in the accumulated stress data loaded from the third memory, and provides the second memory with a second interrupt signal indicating whether the accumulated stress data is abnormal, and wherein, when the display driver integrated circuit is powered on, the accumulated stress data is loaded from the third memory disposed outside the display driver integrated circuit and are stored in the first memory.

* * * * *